US010775530B1

(12) United States Patent
Wilk

(10) Patent No.: US 10,775,530 B1
(45) Date of Patent: Sep. 15, 2020

(54) APPARATUS AND METHOD OF DETECTING A MINERAL IN THE GROUND

(71) Applicant: Peter Wilk, New York, NY (US)

(72) Inventor: Peter Wilk, New York, NY (US)

(*) Notice: Subject to any disclaimer, the term of this patent is extended or adjusted under 35 U.S.C. 154(b) by 0 days.

(21) Appl. No.: 16/555,551

(22) Filed: Aug. 29, 2019

(51) Int. Cl.
*G01V 8/00* (2006.01)
*G01V 8/02* (2006.01)

(52) U.S. Cl.
CPC .............. *G01V 8/005* (2013.01); *G01V 8/02* (2013.01)

(58) Field of Classification Search
CPC ................................. G01V 8/005; G01V 8/02
USPC ........................................................... 342/22
See application file for complete search history.

(56) References Cited

U.S. PATENT DOCUMENTS

| | | | |
|---|---|---|---|
| 4,365,153 A * | 12/1982 | Seigel | G01N 21/6408 250/253 |
| 5,149,959 A * | 9/1992 | Collins | G01J 3/06 250/226 |
| 5,418,367 A * | 5/1995 | Imaeda | G01N 21/25 250/339.01 |
| 9,140,643 B2 * | 9/2015 | Bellian | G01N 21/27 |

OTHER PUBLICATIONS

Kruse, et al. "Fifteen Years of Hyperspectral Data: Northern Grapevine Mountains, Nevada," Proc. 8th JPL Airborne Earth Science Workshop: Jet Propulsion Laboratory, 1999, (12 pages).
Kruse, Fred A. "Mineral Mapping Using Spectroscopy: From Field Measurements to Airborne and Satellite-Based Imaging Spectrometry," Proc. ASARS Symp, 2010, pp. 1-15.
Porter, et al. "A System Overview of the Airborne Visible/Infrared Imaging Spectrometer (Aviris)," Imaging spectroscopy II; Proceedings of the Meeting, San Diego, CA, Aug. 20, 21, 1987, pp. 1-12.

* cited by examiner

*Primary Examiner* — Frank J McGue
(74) *Attorney, Agent, or Firm* — Nutter McClennen & Fish LLP

(57) ABSTRACT

A method of detecting a mineral or metal in ground includes illumination a target region of the ground with electromagnetic radiation to produce a light signature. The method also analyzes the light signature for the presence of the mineral or metal in the target region and determines if the light signature indicates the mineral or metal is present in the ground.

21 Claims, 6 Drawing Sheets

APPARATUS AND METHOD OF DETECTING A MINERAL IN THE GROUND

FIELD

Illustrative embodiments of the invention generally relate to mineral excavation and, more particularly, illustrative embodiments relate to locating minerals present at or near the surface of the ground.

BACKGROUND

Geological veins are sheet-like formations of crystallized minerals found within rock. Geological veins form within rock as water carries these minerals through the ground, depositing them within the rock. The mineral deposits of geological veins often include precious metals, such as gold, silver, ruthenium, rhodium, palladium, osmium, uranium, and iridium, as well as gemstones, such as chrysoberyl, quartz, beryl, garnet, moonstone, apatite, diamond, spinel, tanzanite, tourmaline, topaz, and zircon.

Due to their nature, most geological veins lay underground and their detection from aboveground remains difficult. Determining whether a geological vein possesses valuable metals requires costly excavation and extraction of the mineral deposit, followed by laboratory testing. Imaging spectroscopy (also referred to as hyperspectral remote sensing) is a technology that has been utilized with success for mapping vegetation and mineral abundances over many areas of the Earth's surface using reflected sunlight.

SUMMARY

The physics of visible/near-infrared (VNIR) and shortwave-infrared (SWIR) spectroscopy are well known, and existing imaging spectroscopy techniques (also referred to as hyperspectral remote sensing) have been utilized with success for mapping vegetation and mineral abundances over many areas of the Earth's surface. Existing spectroscopy methods and device are used to identify certain minerals based on their absorptions in the reflected solar range. For example, spectral features in these electromagnetic spectrums enable identification of a variety of materials using spectroscopy, including minerals, vegetation, manmade materials, snow and ice, and water. In geology, small differences in absorption band position and shape can be correlated with mineral compositional differences and variability.

Certain embodiments of the present disclosure provide for devices and methods of investigating surface geology using a device emitting electromagnetic radiation (e.g., light) in order to detect specific minerals or metals in the surface geology by detecting the absorption patterns caused by the emitted light reflecting or scattering off the surface geology or detecting the emission patterns of the minerals in response to the emitted light (e.g. fluorescing). For example, embodiments include searching for gemstones, such as emeralds, in surface geology, by first illuminating the a target region of the surface geology, receiving light from the target region, and then searching for absorption lines at 680 nm and 683 nm or broadband absorption in the violet region of the received light. In other examples, the emitted light can be a single frequency or narrow band light (e.g., from a laser) that corresponds to a specific absorption region of a desired mineral, or, in other instances, of a specific fluorescence region, whereby the desired mineral to be detected emits light by fluorescence in response to being exposed to light of a specific frequency. Illustrative embodiments include using an image sensor to receive the light from the target region and provide the user with a view of the target region indicating where a positive detection of a desired mineral has been found. Embodiments include detecting two or more minerals in the target region based on detected differences in the absorption or emission spectra received from the target region while the target region is illuminated with a light source.

In accordance with one embodiment of the invention, a method of detecting a mineral or metal in soil causes at least a portion of the ground to emit, reflect, or absorb a light signature corresponding to the presence of one or more minerals. The method also analyzes the light signature for the presence of the mineral or metal and determines if the light signature indicates the mineral or metal is present in the ground.

The light signature received from the ground may be detected using spectroscopy and the mineral or metal may be chrysoberyl, quartz, beryl, garnet, moonstone, apatite, diamond, spinel, tanzanite, tourmaline, topaz, and zircon. A user causes the ground to be illuminated by directing an energy source onto at least a portion of the ground. The energy source may be a microwave, or a laser, and may be directed to at least a portion of the ground using a handheld device. Among other ways, the energy source is directed to the at least a portion of the ground while flying over the ground.

In accordance with another embodiment of the invention, an apparatus for detecting a mineral or metal includes an energy source that is able to cause a mineral to fluoresces to by absorbing a specific frequency of light to produce a light signature of a different frequency. The apparatus also includes logic configured to analyze the light signature for the presence of the mineral or metal in the ground and to determine if the light signature indicates that the mineral or metal is present in the ground. Additionally, the apparatus includes a spectroscope that is configured to determine if the light signature is indicative of the mineral or metal of interest.

The apparatus may also be coupled to an aircraft, such as a helicopter, airplane, drone, autogyro, air balloon, or blimp, a hand-held device, or a land-based movable device (e.g., an automobile or similar device).

BRIEF DESCRIPTION OF DRAWINGS

This disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

In illustrative embodiments, an apparatus and method detect underground geological veins containing minerals, including metals. To that end, illustrative embodiments interrogate surface materials above potential underground geological mineral veins for the presence of at least trace amounts of the desired minerals. A ground surface preferably is interrogated by illuminating it; in this case, directing light from a light source to at least a portion of the ground, causing it to absorb one or more distinct frequencies of the light. The spectrum of light absorbed by the ground is analyzed for the spectral signature of the mineral of interest. In one example, a narrow-band or single-frequency light source is used to illuminate the ground, where the narrow-band or single-frequency corresponds to an absorption spectrum of a mineral of interest. Continuing, image sensors tuned to detect absorption of that narrow-band or single-frequency of light are used to determine if, and where, the mineral of interest is present at the surface based on any detected absorption spectrum. Detection of the spectral signature of the mineral of interest indicates the presence of the mineral at the surface and suggest that a geological vein possessing the mineral or metal of interest likely lies underneath or near the interrogated surface area. Details of illustrative embodiments are discussed below.

Geological mineral veins typically lie underground and the detection of underground geological veins comprising specific minerals remains technically difficult without excavation of the land. Undesirably, land excavation can be costly, particularly due to the somewhat speculative nature of mineral exploration. Current technology known to the inventor cannot efficiently solve this problem. The inventor recognized this technical problem and discovered a different, more efficient technology for locating minerals. One such embodiment is described below.

Figure 1:
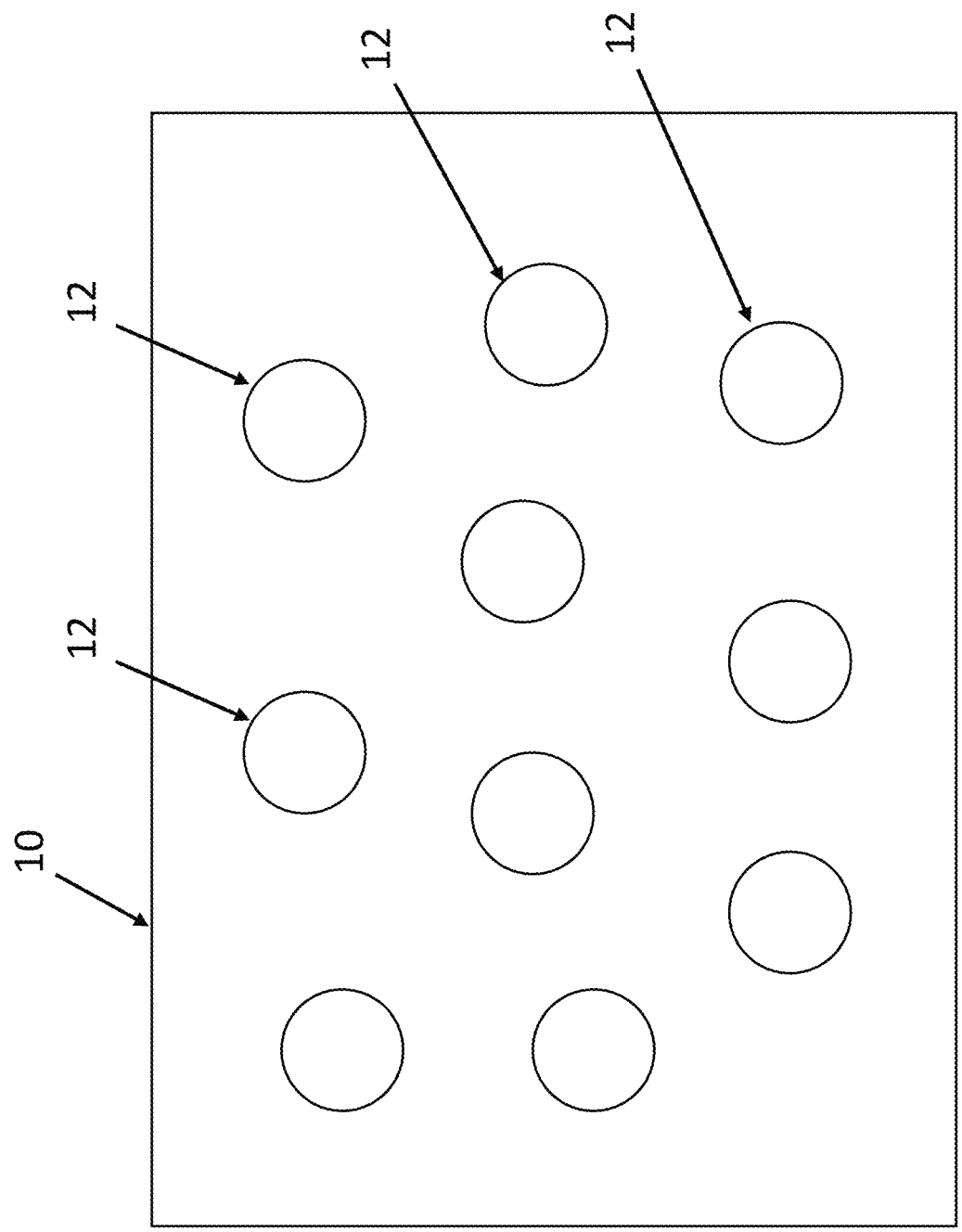
FIG. 1 schematically shows a plot of land that may be analyzed for underground geological mineral veins containing a mineral or metal of interest.

FIG. 1 schematically shows a plot of land 10 that may be analyzed for detecting the presence of minerals or metals visible at or near the surface, which can indicate underground geological mineral veins containing the detected mineral or metal of interest. It should be expressly noted that unless expressly noted otherwise, the term "mineral" is used herein to include metals. Open circles on the figure denote segments 12 of the ground that are visible at the surface, which will be interrogated using the methods described below. A person of ordinary skill in the art will appreciate that a segment 12 can be larger or small and embodiment include continuously scanning the ground 10.

Figure 2:
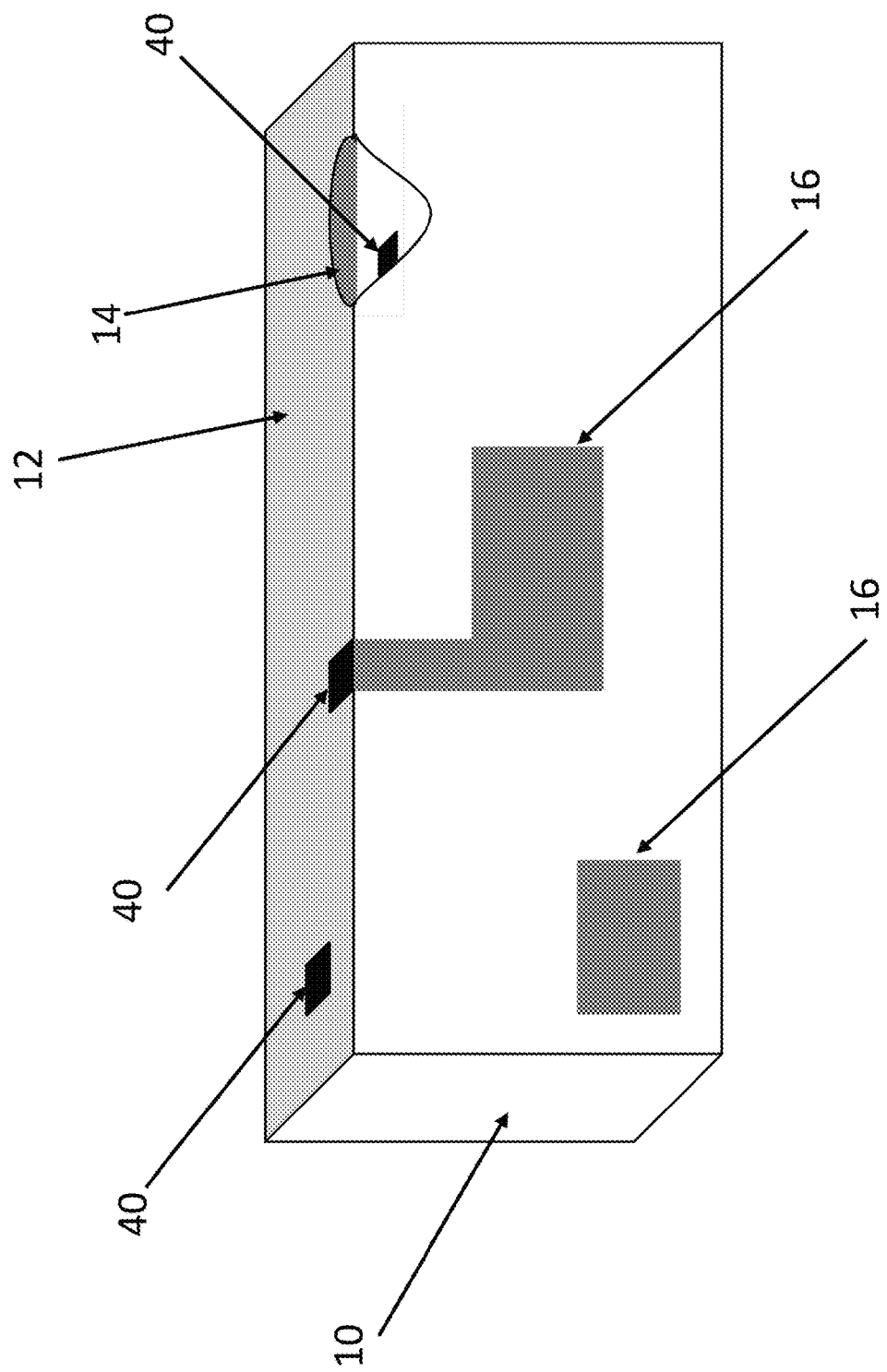
FIG. 2 schematically shows an exemplary cross-section of a target region containing minerals above a geological mineral vein.

FIG. 2 shows a cross-sectional view of an exemplary target region 12 above a geological mineral vein 16, showing individual minerals 40 exposed at or near the surface of the target region 12. Indeed, this figure is schematic and intended merely to illustrate an example of one application of various embodiments. The figure also shows a pool 14 of water in which a mineral 14 is disposed. Various embodiments of the present disclosure detect minerals 40 located beneath water 14 found in the target region 12 where light is able to pass through the water 14 and a light signature from the mineral 40 is able to be detected though light received from the minerals 40 in the water 14. Minerals 40 in the target region can either indicate the presence of a mineral vein 16 below or nearby or be an exposed region of a larger mineral vein 16 that extends below the surface of the target region 12. Geologic processes in the target region 12 can assimilates and distributes minerals 40 from the mineral vein 16 across surface of the target region 12. The inventor recognized that even a trace detection of a mineral 40 in the target region 12 can be used to more efficiently and effectively identify the location of the vein 16 of minerals beneath the surface of the ground.

Figure 3A:
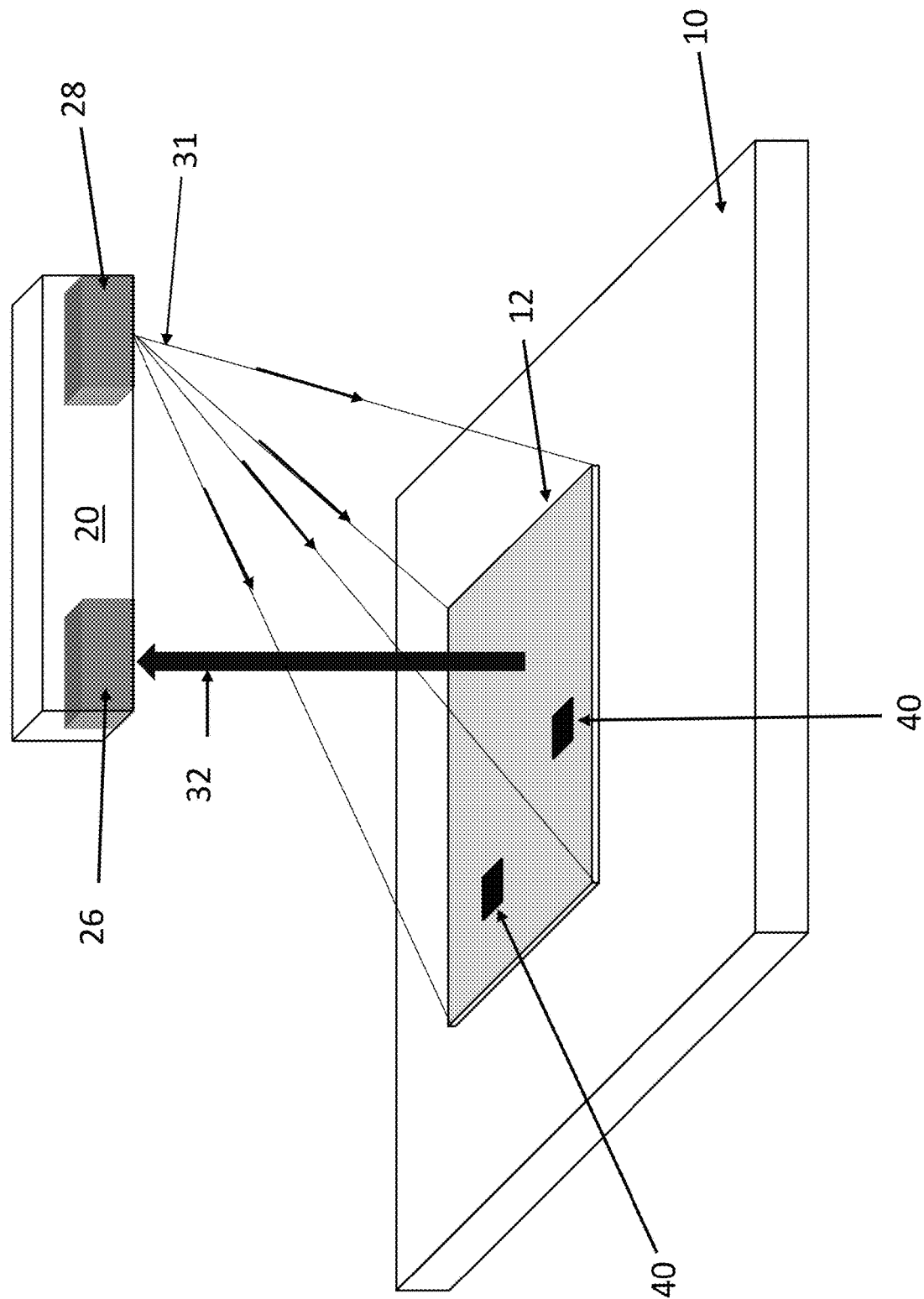
FIG. 3A schematically shows the detection of a specific metal or mineral of interest in a target region using a device present on an aircraft in accordance with illustrative embodiments.

FIG. 3A schematically shows one technique to detect a specific mineral of interest in accordance with one embodiment of the invention. The mineral or metal of interest 40 may be any mineral or metal that may be present in the target regions 12, such as chrysoberyl, quartz, beryl, garnet, moonstone, apatite, diamond, spinel, tanzanite, tourmaline, topaz, and zircon. The technique utilizes an energy device 28 capable of directing light 31 toward at least a portion of a target region 12 to illuminate a portion of the target region 12. As discussed below, the technique analyzes the spectral signature of light 32 received from target region 12 to detect trace amounts of the mineral 40.

FIG. 3A shows one exemplary modality for performing this technique—using an overhead device, such as a plane 20. Indeed, overhead modalities may include any of a wide variety of conventional devices, such as the airplane 20 (as shown in the figure), and this airplane 20 can be piloted or a drone. Other examples include hand-held devices, balloons, gliders, helicopters, autogyros, airships, or blimps.

Various embodiments are not limited to flying devices. For example, some embodiments may implement this modality using a handheld device operated by a user on the ground. Other embodiments envision underwater or waterproof devices to interrogate underwater surface segments 12 (not shown). For example, a diver holding a handheld device may interrogate underwater surface or soil. Alternatively, the modality may be part of a boat or submersible, such as a manned or unmanned submarine.

The energy device 28 is configured to direct light 31 from the plane 20 (or handheld device) toward at least a portion of a segment 12 of the land 10 in a manner that causes the segment 12 to be illuminated with light of one or more frequencies corresponding to the absorption frequencies of one or more minerals or metals to be detected in the segment 12. In illustrative embodiments, this segment 12 then reflects and/or emits light 32 in response to the receive light 31, whereby the light 32 from the segment 12 contains a light signature (e.g., a spectral signature) indicative of any absorption or emission of the received light 31 by minerals 40 in the segment 12 that absorb the received light 31. The energy device 28 (e.g., a light source) may generate electromagnetic energy in a variety of way, such as via a LED or laser. In certain embodiments, associated logic is configured to read the spectral signature of the target region 12. As known by those in the art, the spectral signature is a measurement of the intensity of light over a specific portion of the electromagnetic spectrum. Preferably, the measured portion of the electromagnetic spectrum ranges from about 320 nm to about 1000 nm in wavelength. Among other things, this spectral signature may be read using an optical spectrometer, spectrophotometer, spectrograph, or spectroscope.

To detect the presence or absence of a mineral in a segment 12, illustrative embodiments compare the spectral signature of the reflected, scattered, or emitted light from the segment 12 to the known spectral signature of one or more of a plurality of different minerals. For example, some embodiments may compare the spectral signature of the received light against spectral signatures of emerald and diamond to determine if an emerald or diamond vein 16 is beneath the target region 12. A match between the detected spectral absorption or emission signature and the known spectral signature indicates the presence of the mineral or metal of interest in the segment 12 and is evidence of a geological mineral vein 16 containing the mineral or metal of interest lying underneath or near the segment 12. This process may then be repeated on other segments 12 nearby to map out the approximate location/area of an underground geological mineral vein 16 that contains the mineral or metal of interest.

Figure 3B:
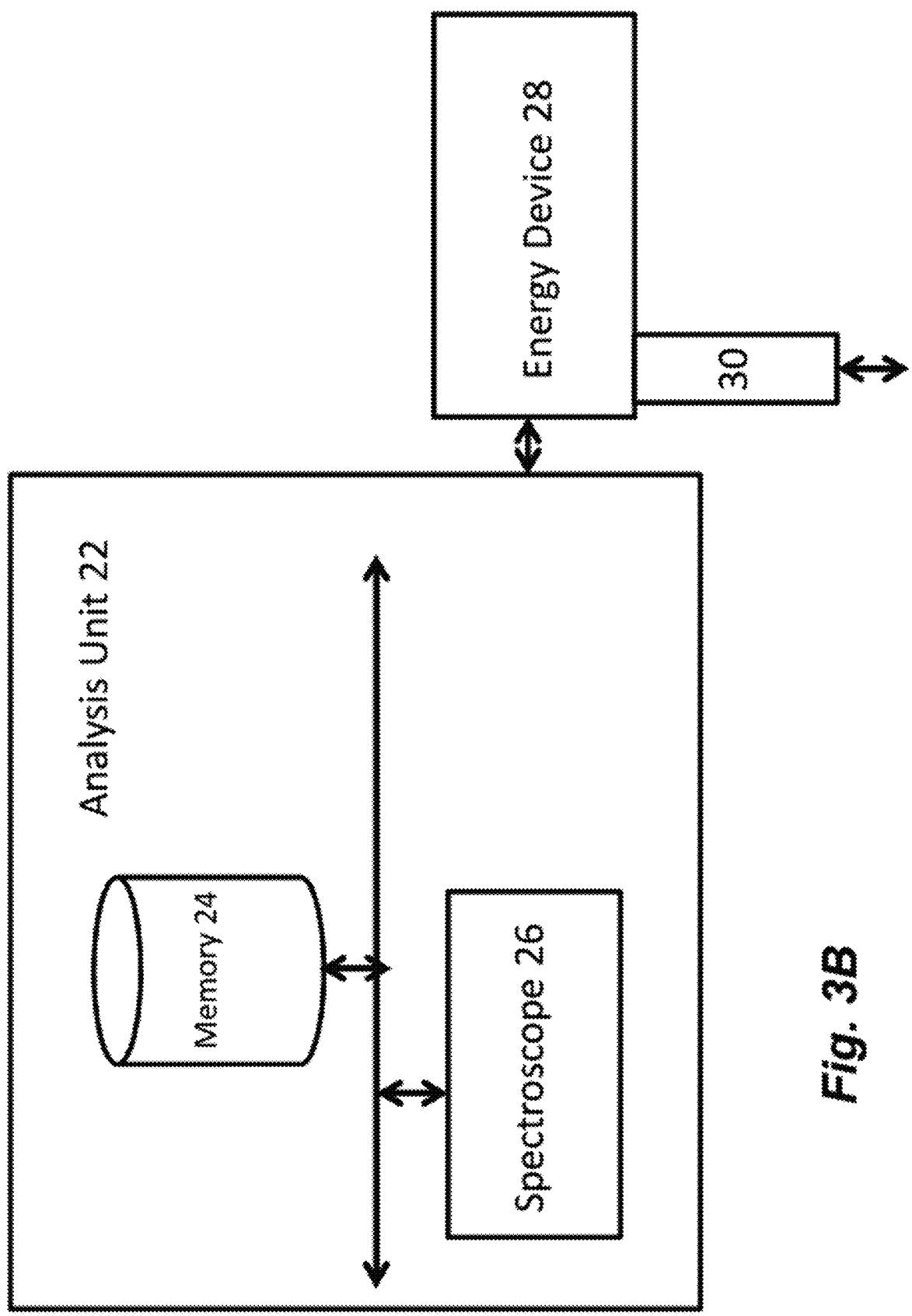
FIG. 3B schematically shows details of a system for detecting the presence of a mineral or metal in accordance with illustrative embodiments of the invention.

FIG. 3B schematically shows more details of a system for detecting the presence of a mineral or metal in accordance with illustrative embodiments. Each of the components of this figure is operatively connected by any conventional interconnect mechanism. FIG. 3B simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 3B only schematically shows each of these components. Those skilled in the art should understand that each of these components can be implemented in a variety of conventional manners, such as by using hardware, software, or a combination of hardware and software, across one or more other functional components. For example, the spectrometer may be implemented using a plurality of microprocessors executing firmware. As another example, the spectrometer may be implemented using one or more application specific integrated circuits (i.e., "ASICs") and related software, or a combination of ASICs, discrete electronic components (e.g., transistors), and microprocessors. Accordingly, the representation of the spectrometer and other components in a single box of FIG. 3B is for simplicity purposes only. In fact, in some embodiments, the spectrometer of FIG. 3B is distributed across a plurality of different machines—not necessarily within the same housing or chassis.

It should be reiterated that the representation of FIG. 3B is a significantly simplified representation. Those skilled in the art should understand that such a device may have many other physical and functional components, such as central processing units, other data processing modules, and short-term memory. Accordingly, this discussion is in no way intended to suggest that FIG. 3B represents all of the elements of a system for detecting a mineral or metal.

As shown, the system includes an analysis unit 22 having memory 24 operatively coupled with a spectroscope 26. Those skilled in the art may select an appropriate type of spectroscope 26 for the task at hand. The memory 24 may store sample data for spectral signatures of various metals and minerals, and output data from the process of FIG. 4 (discussed below). The analysis unit 22 is operatively coupled with an energy device 28 having an output 30 for directing light 31 toward a target region 12 and receiving a signal 32 representative of the light signature of a target region 12.

Figure 4:
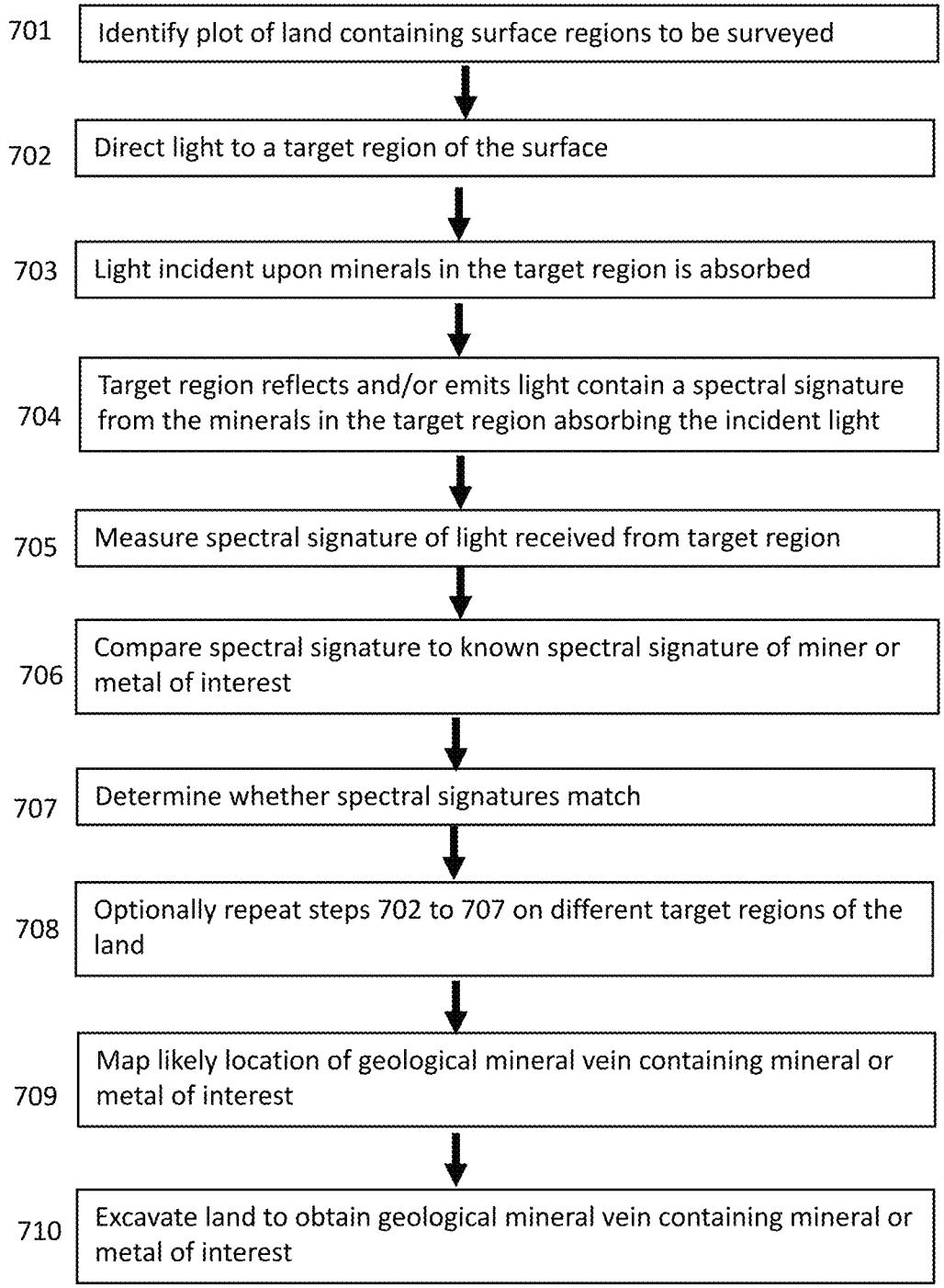
FIG. 4 shows a process of detecting the geological mineral vein in accordance with illustrative embodiments.

FIG. 4 shows a method detecting a mineral vein 16 in accordance with illustrative embodiments of the invention. It should be noted that this process is substantially simplified from a longer process that normally may be used to locate the mineral vein 16. Accordingly, the process of locating the mineral vein 16 may have many steps, such as testing steps or extraction steps, which those skilled in the art may use. In addition, some of the steps may be performed in a different order than that shown, or at the same time. Those skilled in the art therefore can modify the process as appropriate. Moreover, as noted above and below, many of the devices and structures noted are but one of a wide variety of different devices and structures that may be used. Those skilled in the art can select the appropriate devices and structures depending upon the application and other constraints. Accordingly, discussion of specific devices and structures is not intended to limit all embodiments.

The method begins at step 701, which identifies a plot of land 10 for surveying. The plot of land 10 ideally has sufficient ground exposure (e.g., lack of dense foliage) such that more than one target regions 12 on the land can be interrogated. Next, at step 702, a device directs electromagnetic energy toward at least a portion of a target region 12 on the plot of land 10. This energy source may be any energy source capable of causing minerals or metals exposed at the surface to reflect, scatter, or emit light in response to the received electromagnetic energy (e.g., a laser or an LED). Preferably, as noted above, the energy source is a LED or a laser delivered by some modality. Depending on any sunlight incident on the target region, one skilled in the art will appreciate that the amount of electromagnetic energy used should be sufficiently illuminate the target region 12 such that any light signature from the emitted light is distinguished from the light signature from the sunlight or other ambient light, which is dependent on the sensitivity of the device used to analyze the light signature (e.g., a spectrophotometer). Some embodiments therefore may vary in their specific use and operating conditions (e.g., time of day, distance to ground, length of exposure), depending on the instrumentation used, the strength of the illumination, and the quality of the illumination (e.g., broadband vs. narrow band), and the type of light signature being detected (e.g., reflective vs. emissive).

When electromagnetic energy (e.g., light) is directed toward at least a portion of the target region 12, the minerals in target region 12 absorb one or more specific frequencies of the light, as depicted in step 703. The target region 12 reflects light in step 704 absent the light absorbed by the minerals, which forms a light signature, and an optical device then measures the spectrum of emitted light at step 705. In some instances, the minerals in the target region also emit light at specific frequencies in response to the absorbed light due to, for example, fluorescence. Among other things, as noted above, the optical device may include an optical spectrometer, spectrophotometer, spectrograph, or, a spectroscope. The spectral signature of the emitted light is anticipated to read from about 320 nm to about 1000 nm, although other ranges may be used. Step 706 then compares the measured spectral signature (e.g., light signature) to the known spectral signature of one or more minerals of interest, such as chrysoberyl, quartz, beryl, garnet, moonstone, apatite, diamond, spinel, tanzanite, tourmaline, topaz, and zircon. In some instances, the minerals include organics such as those found in bones or fossils. Step 707 then determines whether the spectral signatures match a known spectral signature of a mineral or metal of interest. If the spectral signatures do match, this indicates that the mineral of interest is present in the target region 12, which is also evidence of a geological mineral vein 16 containing the mineral of interest underground, beneath, or near the target region 12.

In step 708, this process is optionally repeated on at least one other target region 12 lying on the plot of land 10. After carrying out this process on one or target regions 12 on the plot of land 10, illustrative embodiments generate a map 32 of the potential location of the geological mineral vein 16 based on the results of the spectral analysis (step 709). As noted, target regions 12 that produced spectral signatures matching the known spectral signature of the mineral of interest are likely to have a geological mineral vein 16 containing the mineral of interest running underground beneath or near them. Conversely, target regions 12 that did not produce spectral signatures matching the known spectral signature of the mineral of interest are unlikely to have a geological mineral vein 16 containing the mineral of interest running underground beneath or near them. Based on this information, illustrative embodiments generate a map 32 of the approximate location of the geological mineral vein 16, which subsequently can be excavated in step 710 to extract the mineral of interest from the geological mineral vein 16.

Figure 5:
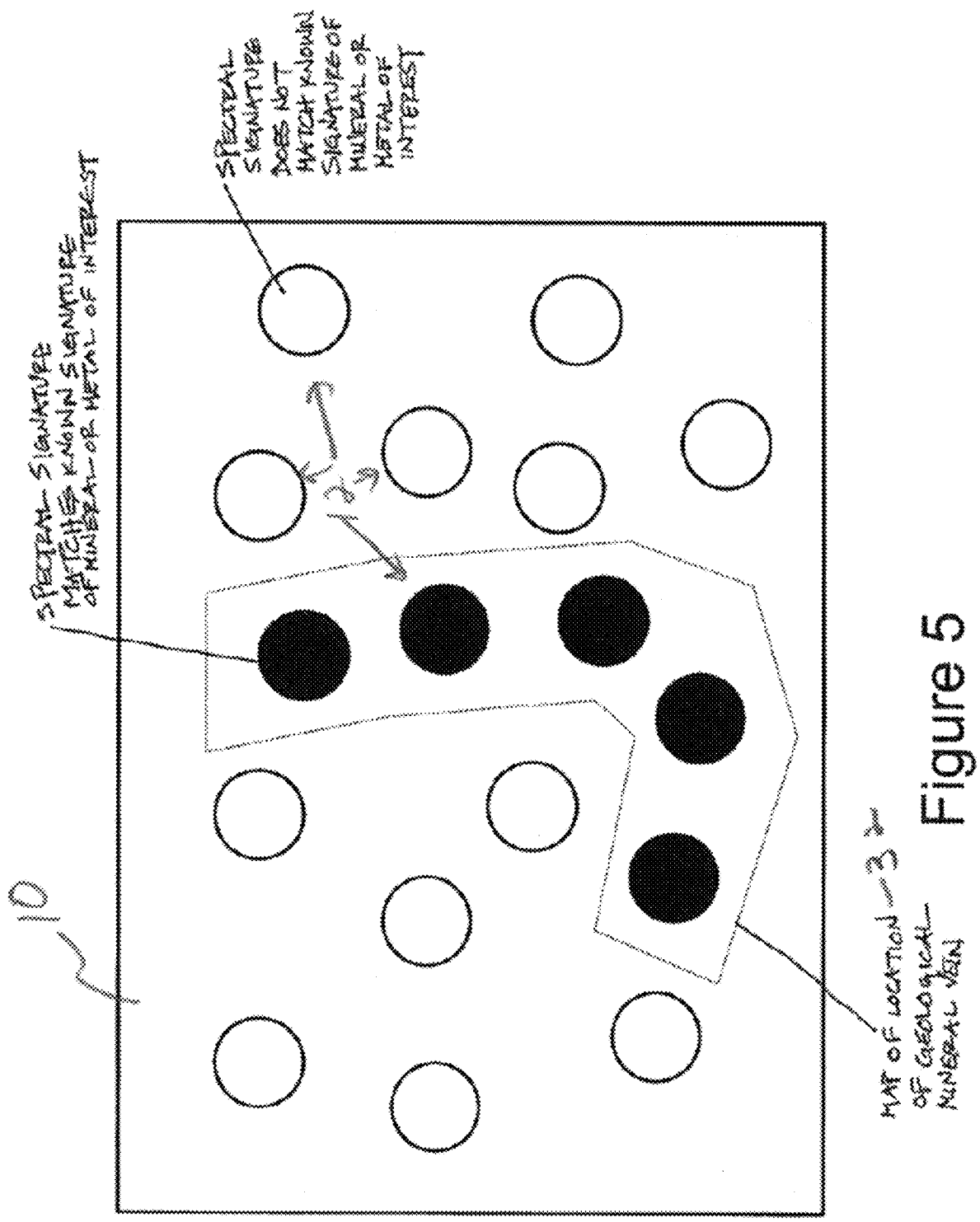
FIG. 5 shows an exemplary plot of land that has been analyzed for the presence of a geological mineral vein using the method of FIG. 4.

FIG. 5 shows an exemplary plot of land 10 that has been analyzed by the method described above. Target regions 12 that produced spectral signatures matching the known spectral signature of the mineral of interest are depicted by black-filled circles. Target regions 12 that did not produce spectral signatures matching the known a signature of the mineral of interest are depicted by open circles. Based on this information, the probable location of a geological mineral vein 16 containing the mineral of interest is determined, as depicted by the area within the dotted line. This area can then be excavated to extract the mineral vein 16 containing the mineral of interest.

Alternative embodiments avoid the need for the investigations per target region 12 by continuously scanning the ground as the illumination region and, in some instances, the device itself, moves across the ground. For example, a human operator carrying a device could investigate the ground around of them as they walk, and the device could indicate if a positive detection is made. Similarly, a device carried by a vehicle, such as a drone, could traverse and scan a ground region and generate a map or list of locations where positive detections were made. In some instances, various embodiments of the disclosure generate a map of the surface mineral content in a region by scanning the region and detecting both the presence and the boundaries between different types of minerals and illustrating the corresponding bounds as a map, which could be overlaid with an existing map.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method of locating a mineral or metal in the ground, the method comprising:
    illuminating, using an artificial light source, a target region of the surface of the ground with electromagnetic energy to produce a light signature from the target region;
    receiving, using an image sensor, electromagnetic energy from a field of view of the target region comprising the light signature;
    analyzing the light signature for the presence of the mineral or metal in the target region;
    determining that the light signature indicates the mineral or metal is present at a location in the field of view; and
    generating an image of the field of view of the target region from the image sensor indicating the location in the field of view where a positive detection of the mineral or metal has been found.

2. The method of claim 1 wherein the light signature is detected using spectroscopy.

3. The method of claim 1 wherein the mineral is selected from the group comprising chrysoberyl, quartz, beryl, garnet, moonstone, apatite, diamond, spinel, tanzanite, tourmaline, topaz, and zircon.

4. The method of claim 1 wherein illuminating a target region of the ground with electromagnetic energy comprises directing the artificial light source onto the at least a portion of the target region.

5. The method of claim 4 wherein the artificial light source is a microwave device, or a laser.

6. The method of claim 4 wherein the artificial light source is directed to the at least a portion of the target region using a handheld device.

7. The method of claim 4 wherein the artificial light source is directed to the at least a portion of the target region while flying over the target region.

8. The method of claim 1, comprising illuminating the target region with electromagnetic energy having a frequency that causes fluorescence of one or more frequencies in a mineral in the target region and the light signature comprises the one or more frequencies of the fluorescence.

9. The apparatus of claim 8 wherein the mineral is selected from the group comprising chrysoberyl, quartz, beryl, garnet, moonstone, apatite, diamond, spinel, tanzanite, tourmaline, topaz, and zircon.

10. The method of claim 1, comprising generating a map of the surface mineral or metal content in the target region by
   detecting the presence and the boundaries between different types of detected minerals or metals, and
   illustrating the detected bounds as a map of the target region.

11. An apparatus for detecting a mineral or metal, the apparatus comprising:
   an artificial light source configured to illuminate a target region of the ground with electromagnetic energy to produce a light signature from the target region;
   an image sensor spectroscope configured to observe a field of view of the target region and receive the light signature, analyze the light signature, and determine whether the light signature is indicative of the mineral or metal at a location in the field of view, the image sensor spectroscope being configured to generate an image of the field of view of the target region from the image sensor indicating the location in the field of view where a positive detection of the mineral or metal has been found.

12. The apparatus of claim 11 wherein the artificial light source is a microwave device or a laser.

13. The apparatus of claim 11 wherein the apparatus is handheld.

14. The apparatus of claim 11 wherein the apparatus is configured to be coupled to an aircraft.

15. The apparatus of claim 14 wherein the aircraft is a helicopter, airplane, drone, autogyro, air balloon, or blimp.

16. The apparatus of claim 11 wherein the spectroscope includes a comparator to compare the light signature to a known light signature of the mineral or metal.

17. The apparatus of claim 11, wherein the artificial light source is configured to illuminate the target region with electromagnetic radiation that causes fluorescence of one or more frequencies in a mineral in the target region and the light signature comprises the one or more frequencies of the fluorescence.

18. A computer program product for use on a computer system for locating a mineral or metal in the ground, the computer program product comprising a tangible, non-transient computer usable medium having computer readable program code thereon, the computer readable program code comprising:
   program code for illuminating a target region of the ground with electromagnetic energy from an artificial light source to produce a light signature from the target region;
   program code for receiving, using an image sensor, electromagnetic energy from a field of view of the target region comprising the light signature
   program code for analyzing the light signature for the presence of the mineral or metal in the target region;
   program code for determining that the light signature indicates the mineral or metal is present at a location in the field of view, and
   program code for generating an image of the field of view of the target region from the image sensor indicating the location in the field of view where a positive detection of the mineral or metal has been found.

19. The computer program product of claim 18 wherein the light signature is detected using spectroscopy.

20. The computer program product of claim 18 wherein the mineral is selected from the group comprising chrysoberyl, quartz, beryl, garnet, moonstone, apatite, diamond, spinel, tanzanite, tourmaline, topaz, and zircon.

21. The computer program product of claim 18, comprising program came for generating a map of the surface mineral or metal content in the target region by detecting the presence and the boundaries between different types of detected minerals or metals, and illustrating the detected bounds as a map of the target region.

* * * * *